(12) United States Patent
Hamaguchi et al.

(10) Patent No.: US 6,865,039 B2
(45) Date of Patent: Mar. 8, 2005

(54) MASTER MEDIUM FOR MAGNETIC TRANSFER, MAGNETIC TRANSFERRING AND RECORDING METHOD, SLAVE MEDIUM FOR MAGNETIC RECORDING, AND METHOD FOR PRODUCING A MASTER MEDIUM FOR MAGNETIC TRANSFER

(75) Inventors: Shingo Hamaguchi, Kawasaki (JP); Sumio Kuroda, Kawasaki (JP); Kazuyuki Ozaki, Kawasaki (JP); Ken Tamanoi, Kawasaki (JP); Koji Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 10/101,369

(22) Filed: Mar. 20, 2002

(65) Prior Publication Data

US 2003/0123169 A1 Jul. 3, 2003

(30) Foreign Application Priority Data

Dec. 28, 2001 (JP) ........................................ 2001-402009

(51) Int. Cl.⁷ .............................................. G11B 5/86
(52) U.S. Cl. .......................................... 360/17; 360/131
(58) Field of Search .............................. 360/15, 16, 17, 360/55, 57, 131; 428/694 TM, 694 MM, 694 BM

(56) References Cited

U.S. PATENT DOCUMENTS

| 4,422,106 A | * 12/1983 | Sawazaki ...................... 360/17 |
| 5,703,733 A | * 12/1997 | Suzuki et al. ............ 360/77.01 |
| 5,851,643 A | * 12/1998 | Honda et al. ............... 428/212 |

FOREIGN PATENT DOCUMENTS

JP          2001-23163          1/2001

* cited by examiner

Primary Examiner—Alan T. Faber
(74) Attorney, Agent, or Firm—Greer, Burns & Crain, Ltd.

(57) ABSTRACT

A master medium for magnetic transfer includes a substrate having a concave portion formed in its surface corresponding to a pattern of recorded information to be transferred; a first perpendicular ferromagnetic layer deposited in the concave portion; and a second perpendicular ferromagnetic layer layered on the substrate surface and the first perpendicular ferromagnetic layer surface. The substrate surface and the first perpendicular ferromagnetic layer surface are flattened to form a single flat surface. In the master medium for magnetic transfer, a magnetic field change in a direction parallel to the substrate surface at a magnetization boundary of the first perpendicular ferromagnetic layer is steep. Since the influence of the change of an external magnetic field is reduced, it is possible to perform accurate transfer from the master medium for magnetic transfer to a slave medium for magnetic recording.

14 Claims, 10 Drawing Sheets

MAGNETIZATION
DIRECTION IN
INITIALIZED
STATE
(TM-RE)

MAGNETIZATION
DIRECTION IN
INITIALIZED
STATE
(TM-TM OR RE-RE)

MAGNETIZATION
DIRECTION IN
EXTERNAL MAGNETIC
FIELD APPLIED STATE
(TM-RE)

MAGNETIZATION
DIRECTION IN
EXTERNAL MAGNETIC
FIELD APPLIED STATE
(TM-TM OR RE-RE)

FIG. 7A STATE 0
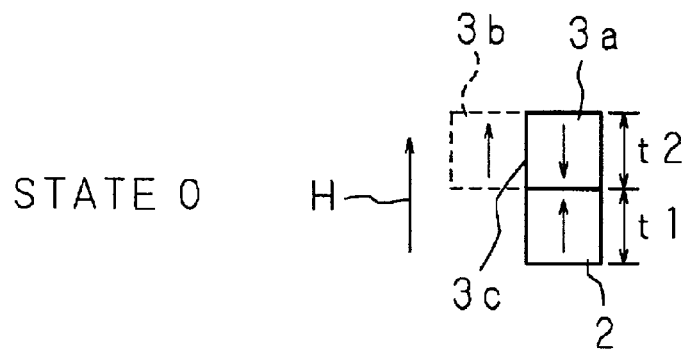
FIG. 7B STATE 1
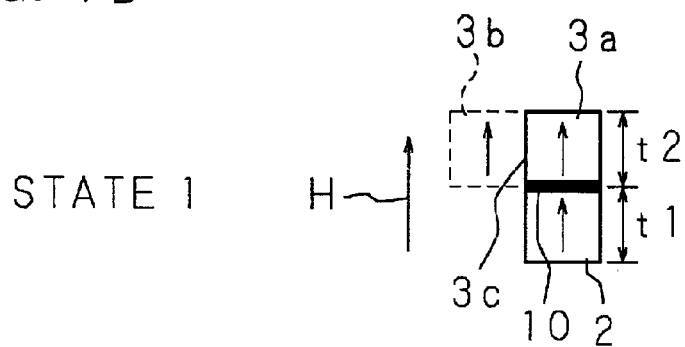
FIG. 7C STATE 2
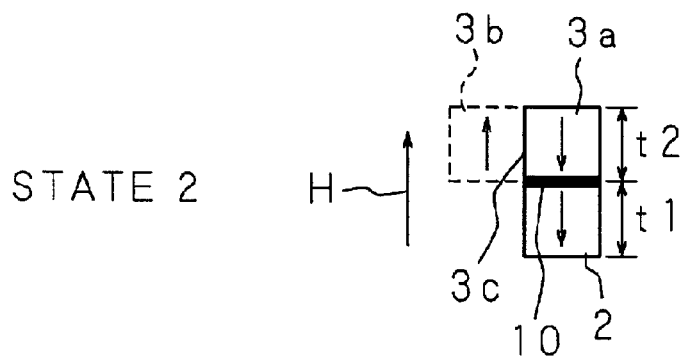
FIG. 7D STATE 3
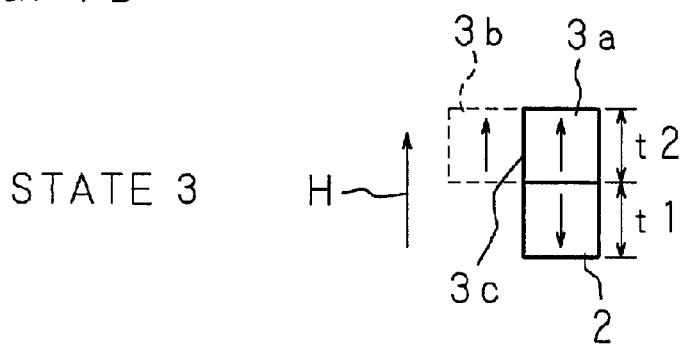

STATE 0

STATE 1

STATE 2

STATE 3

MASTER MEDIUM FOR MAGNETIC TRANSFER, MAGNETIC TRANSFERRING AND RECORDING METHOD, SLAVE MEDIUM FOR MAGNETIC RECORDING, AND METHOD FOR PRODUCING A MASTER MEDIUM FOR MAGNETIC TRANSFER

BACKGROUND OF THE INVENTION

1. Field of the Invention

The present invention relates to a master medium for magnetic transfer, a magnetic transferring and recording method, a slave medium for magnetic recording, and a method for producing a master medium for magnetic transfer. In particular, the present invention enables accurate transfer of recorded information even when an external magnetic field changes because of some influence during the transfer.

2. Description of Related Art

For writing of a servo signal or the like on a slave medium for magnetic recording (hereinafter simply referred to as a "slave medium"), there has been a known method in which a master medium for magnetic transfer (hereinafter simply referred to as a "master medium") is fabricated in advance, and then the recorded information on the master medium is transferred to the slave medium. In this method, there is no need to write signals one by one, and thus the write time is significantly reduced. Moreover, in order to reduce the write time during the fabrication of the master medium, there is a proposed method in which concave and convex portions are formed on a non-magnetic substrate, a ferromagnetic material is buried in the concave portion, and a leakage magnetic field corresponding to a predetermined mark is generated by changing the magnetization so as to achieve transfer.

FIGS. 1A and 1B are explanatory views of a conventional master medium. FIG. 1A illustrates an example in which the buried magnetic material is a soft magnetic material. FIG. 1B shows an example in which the buried magnetic material is a perpendicular ferromagnetic material. In FIG. 1A, concave portions 20 are formed in a substrate 1, and a soft magnetic material 4s is buried in the concave portions 20. The substrate 1 is used as the master medium. Meanwhile, a slave medium 5 has been initialized in the direction of magnetization 5m in advance. By applying an external magnetic field in a state where the master medium and the slave medium 5 are juxtaposed, magnetic lines of force 12 produced by the external magnetic field converge on the area of the soft magnetic material 4s and then pass through the slave medium 5. As a result, even in the slave medium 5, an area adjacent to the soft magnetic material 4s is rewritten by the external magnetic field (magnetic lines of force 12). Since the magnetization 5m of the initialized state remains as it is in an area which is not adjacent to the soft magnetic material 4s, the information recorded on the master medium is transferred to the slave medium 5.

In FIG. 1B, the master medium comprises the substrate 1 having a perpendicular ferromagnetic layer 4 buried in the concave portions 20. By applying an external magnetic field in a state where the master medium and the slave medium 5 are juxtaposed, the perpendicular ferromagnetic layer 4 follows the external magnetic field and produces a leakage magnetic field in the direction of increasing the external magnetic field. Therefore, the slave medium 5 receives a strong external magnetic field 14 from the concave portions 20 (the area of the perpendicular ferromagnetic layer 4) and receives a weak external magnetic field 13 from an area other than the concave portions 20 (an area where the perpendicular ferromagnetic layer 4 is not present). For example, when the external magnetic field is adjusted so that the intermediate value between the strength of the strong external magnetic field 14 and the strength of the weak external magnetic field 13 becomes a magnetic field of a strength which inverts the initialized magnetization of the slave medium 5, the initialized magnetization of the slave medium 5 is inverted in the area of the strong external magnetic field 14, but the initial magnetization of the slave medium 5 is not inverted in the area of the weak external magnetic field 13. In this case, the pattern (recorded information) on the master medium corresponding to the concave portions 20 of the substrate 1 is transferred to the slave medium 5.

FIGS. 2A–2D are explanatory views of the magnetic field state and the magnetization boundary shifted amount of a conventional master medium. The same parts as in FIGS. 1A and 1B are designated with the same codes, and the explanation thereof is omitted.

FIG. 2A shows ideal magnetic lines of force 15. FIG. 2B illustrates actual magnetic lines of force 16. In the case of the ideal magnetic lines of force 15, a magnetization boundary 5c of the slave medium 5 is present in a position on a line extended from the perpendicular ferromagnetic layer 4 in a perpendicular direction. In the case of the actual magnetic lines of force 16, since the magnetic lines of force 16 spread, the magnetization boundary 5c of the slave medium 5 changes according to the spread state of the magnetic lines of force 16.

FIG. 2C shows a change of magnetic field in a direction parallel to the substrate surface at the position of the slave medium 5 caused by the spread of the magnetic lines of force 16. The horizontal axis indicates the position from the center of the perpendicular ferromagnetic layer 4 as a relative value. The relative value is expressed by standardizing an end of the perpendicular ferromagnetic layer 4 in a direction parallel to the substrate surface (in theory, the end is the magnetization boundary 5c as shown in FIG. 2A) as 1. The vertical axis indicates a magnetic field at a position of a plane in a direction parallel to the substrate surface, at an arbitrary distance from the substrate 1 toward the slave medium 5. The magnetic field changes in the periphery of the magnetization boundary 5c, and the magnetic field changes in a slanting manner.

FIG. 2D shows the relationship between the change of the external magnetic field and the shift amount of the magnetization boundary. With respect to a slave medium inversion magnetic field Hi, if a magnetization boundary produced by application of an external magnetic field Hn as a reference value is set as a standard, then, when an external magnetic field Hs stronger than the external magnetic field Hn is applied, the magnetization boundary becomes wider outward and shifts outward by an amount ΔSns. On the other hand, when an external magnetic field Hw weaker than the external magnetic field Hn is applied, the magnetization boundary becomes narrower inward and shifts inward by an amount ΔSnw. Thus, when the external magnetic field changes in a slanting manner at a configuration boundary, since the magnetization boundary shifts according to the level of the external magnetic field strength, the configuration boundary does not coincide with the magnetization boundary.

The magnetization boundary becomes a transfer pattern boundary during transfer from the master medium to the slave medium. Accordingly, in order to perform accurate transfer by reducing the positional deviation of the transfer pattern, it is necessary to reduce the change of the transfer pattern boundary. Therefore, it is required to make the state of magnetic field change closer to the theoretical one (FIG. 2A), i.e., to make the change of magnetic field in a direction parallel to the substrate surface steep. In order to realize the steep change of magnetic field, it has been suggested to increase the magnetic field itself, more specifically, to increase the saturation magnetization of the perpendicular ferromagnetic material of the master medium, to increase the layer thickness of the perpendicular ferromagnetic material of the master medium and to bring the master medium and the slave medium more closer to each other. However, each of these solution means has its physical limit.

As described above, in the conventional master medium, the magnitude of the external magnetic field in a direction parallel to the substrate surface is at a slant. Since the transfer pattern boundary (magnetization boundary) changes because of the influence of change of the external magnetic field, an accurate transfer pattern cannot be obtained.

The change of the external magnetic field occurs, for example, when the magnitude of the magnetic field produced by a magnet deviates from a desired value, or when there is a spatial deviation in the interval between the master medium and the slave medium during transfer. The change causes a change in the size of the pattern transferred.

BRIEF SUMMARY OF THE INVENTION

The present invention has been made with the aim of solving the above problem, and it is an object thereof to provide a master medium capable of making a steep change of magnetic field in a direction parallel to a substrate surface, reducing the influence of a change of an external magnetic field, and realizing accurate transfer from a master medium to a slave medium.

Another object of the present invention is to provide a magnetic transferring and recording method using a master medium of the present invention, a slave medium to which information was transferred by the magnetic transferring and recording method, and a method for producing a master medium of the present invention.

A master medium according to the present invention comprises: a non-magnetic substrate; a first perpendicular ferromagnetic layer deposited in a concave portion formed in a surface of the substrate; and a second perpendicular ferromagnetic layer layered on the substrate surface and a surface of the first perpendicular ferromagnetic layer. Accordingly, it is possible to make a steep change of a magnetic field in a direction parallel to the substrate surface at a magnetic field boundary of the first perpendicular ferromagnetic layer of the master medium.

Moreover, in the master medium according to the present invention, the substrate surface and the first perpendicular magnetic layer surface are flattened to form a single flat surface.

A master medium according to the present invention is constructed to perform exchange coupling so that a magnetization direction of the first perpendicular ferromagnetic layer and a magnetization direction of the second perpendicular ferromagnetic layer are parallel to each other.

Another master medium according to the present invention is constructed to make exchange coupling so that the magnetization direction of the first perpendicular ferromagnetic layer and the magnetization direction of the second perpendicular ferromagnetic layer are anti-parallel to each other. In this master medium, saturation magnetization Ms1 and layer thickness t1 of the first perpendicular ferromagnetic layer and saturation magnetization Ms2 and layer thickness t2 of the second perpendicular ferromagnetic layer satisfy a relation Ms1·t1>Ms2·t2.

In the master mediums according to the present invention, it is possible to increase the magnetic fields produced by the first perpendicular ferromagnetic layer and the second perpendicular ferromagnetic layer. Accordingly, it is possible to make a steep magnetic filed change at a pattern boundary and reduce the deviation of the transfer position of a magnetization pattern caused by a change of an external magnetic field. In addition, with the same level of transfer accuracy, the margin for the change of the external magnetic field can be increased. In this case, it is possible to increase the usable range of an external magnetic field generator.

A magnetic transferring and recording method according to the present invention comprises: the step of juxtaposing a master medium according to the present invention and a slave medium having a perpendicular anisotropy whose magnetization has been initialized in one direction in advance; and the step of applying an external magnetic field of a direction opposite to the initialized magnetization direction of the slave medium. Recorded information on the master medium is transferred to the slave medium for magnetic recording. It is possible to perform magnetic transferring and recording with high transfer accuracy by the magnetic transferring and recording method.

A slave medium according to the present invention has the recorded information of the master medium, which was transferred by the magnetic transferring and recording method of the present invention. The recorded information is transferred accurately to the slave medium.

A method for producing a master medium according to the present invention is a method for producing a master medium having a first perpendicular ferromagnetic layer and a second perpendicular ferromagnetic layer on a substrate surface. The method for producing the master medium comprises: the step of forming a concave portion in the substrate surface; the step of forming the first perpendicular ferromagnetic layer in the concave portion by depositing the first perpendicular ferromagnetic layer on the substrate surface; a flattening step of flattening the substrate surface and a surface of the first perpendicular ferromagnetic layer to form a single flat surface; and a depositing step of depositing the second perpendicular ferromagnetic layer on the flattened substrate surface and first perpendicular ferromagnetic layer surface.

Moreover, the method for producing a master medium according to the present invention further comprises the step of etching the flattened substrate surface and first perpendicular ferromagnetic layer surface, between the flattening step and the depositing step.

According to the master medium production method of the present invention, it is possible to provide a master medium having high transfer accuracy in a stable manner.

The above and further objects and features of the invention will more fully be apparent from the following detailed description with accompanying drawings.

BRIEF DESCRIPTION OF THE SEVERAL VIEWS OF THE DRAWINGS

FIGS. 7A–7D are explanatory views of the magnetization state according to an embodiment of the present invention;

DETAILED DESCRIPTION OF THE INVENTION

The following description will explain the present invention in detail with reference to the drawings illustrating some embodiments thereof.

Figure 3:
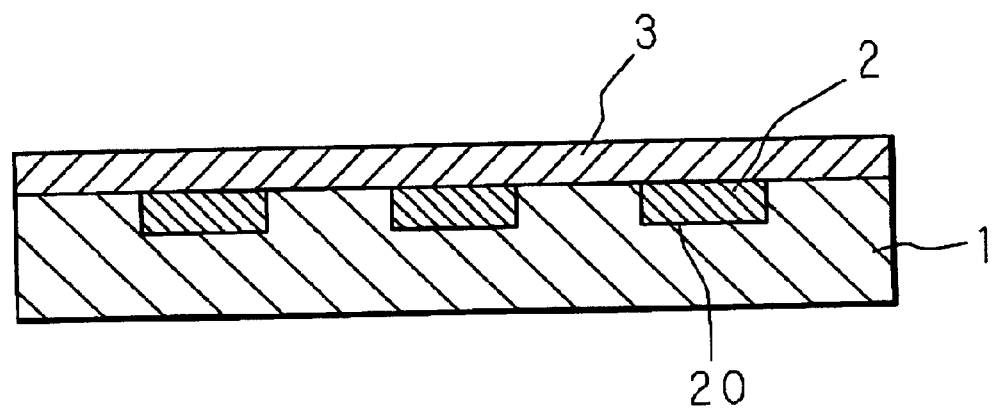
FIG. 3 is a cross sectional view of a master medium for magnetic transfer according to the present invention.

FIG. 3 is a cross sectional view of a master medium of the present invention. In FIG. 3, the reference code 1 represents a non-magnetic substrate with a flat surface, and, for example, a glass substrate, a synthetic resin substrate such as polycarbonate, a metal substrate such as aluminum, a silicon substrate, and a carbon substrate are applicable. The substrate 1 is provided with concave portions 20 on the surface thereof, which are formed corresponding to the pattern of recorded information to be transferred. Further, a first perpendicular ferromagnetic layer 2 is deposited/formed on the substrate 1. The surface of the substrate 1 and the surface of the first perpendicular ferromagnetic layer 2 are flattened to form a single flat surface. A second perpendicular ferromagnetic layer 3 is deposited/formed on the flattened single flat surface (the surface of the substrate 1 and the surface of the first perpendicular ferromagnetic layer 2). The first perpendicular ferromagnetic layer 2 and the second perpendicular ferromagnetic layer 3 are made of a perpendicular magnetic material having perpendicular magnetic anisotropy. The material of the perpendicular magnetic material is not particularly limited if it satisfies the need for forming patterns on the master medium at a necessary external magnetic field. It is possible to use various kinds of materials, such as TbFeCo, TbFe, TbCo, GdFeCo, DyFeCo, FePt, Co/Fe and Co/Pd, for example. For the first perpendicular ferromagnetic layer 2 and the second perpendicular ferromagnetic layer 3, it is preferred to use a combination of materials that effect strong exchange coupling at ordinary temperature. As a slave medium, it is possible to use, for example, a Co—Cr based material as well as the materials for the master medium mentioned above.

Figure 4A:
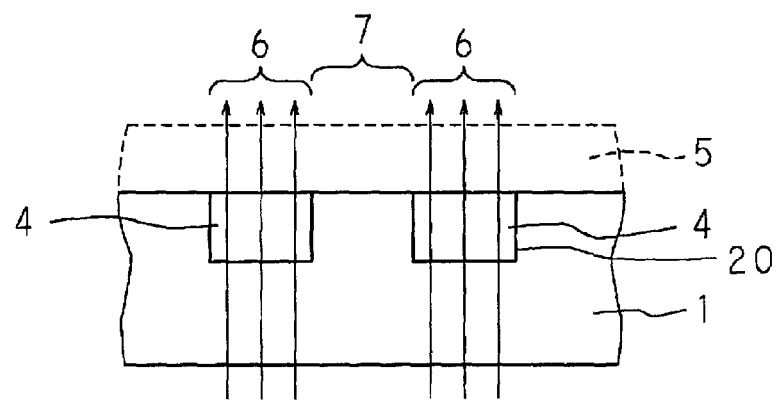
FIGS. 4A and 4B are explanatory views of the state of magnetic lines of force in the master medium for magnetic transfer according to the present invention.
Figure 4B:
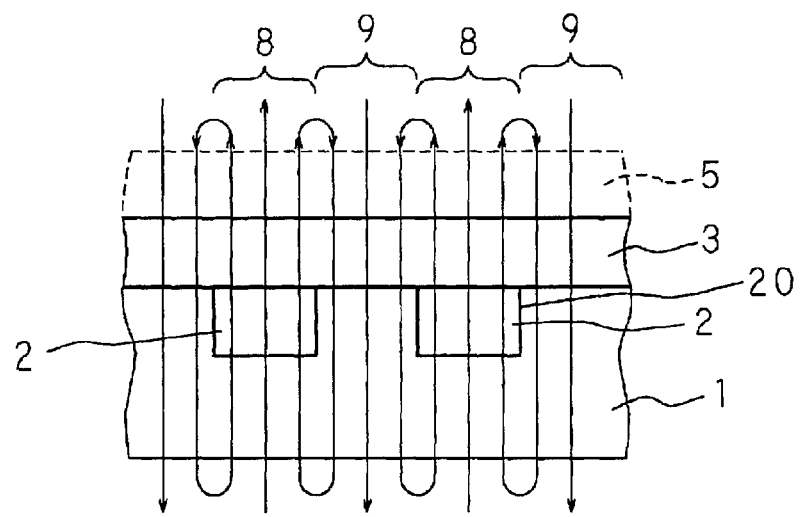
Figure 5A:
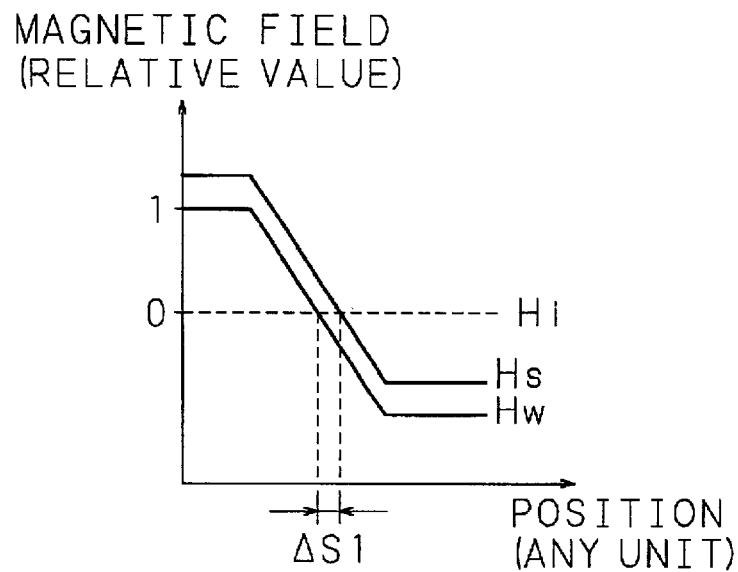
FIGS. 5A and 5B are explanatory views of the magnetic field state and magnetization boundary shift amount in association with FIGS. 4A and 4B.
Figure 5B:
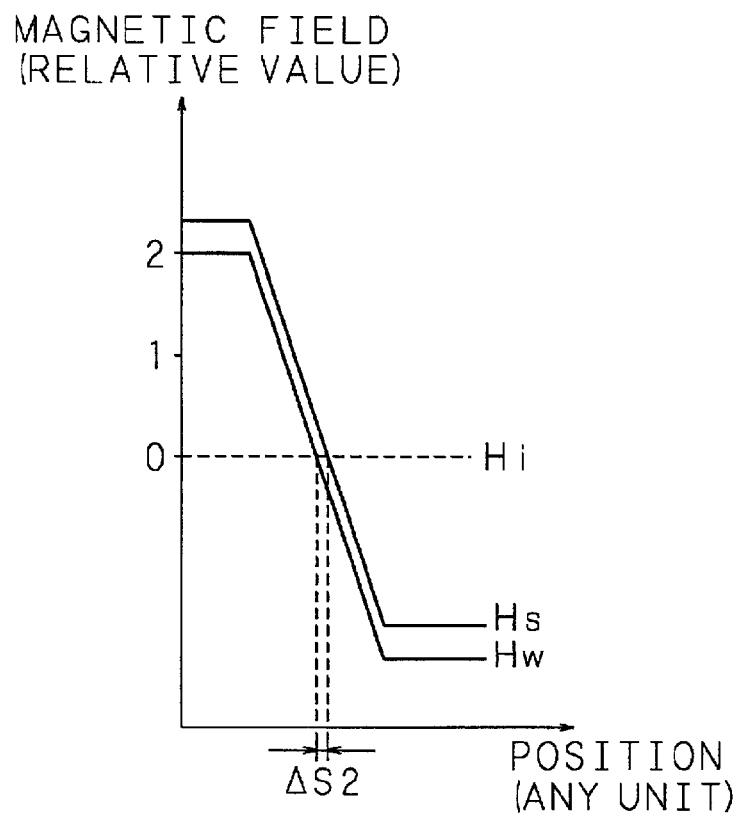

FIGS. 4A and 4B are explanatory views of the state of magnetic lines of force in the master medium of the present invention. FIG. 4A shows the state of magnetic lines of force in a conventional master medium for a comparison purpose. FIG. 4B illustrates the state of magnetic lines of force in the master medium of the present invention. FIGS. 5A and 5B are explanatory views of the magnetic field state and the magnetization boundary shift amount in association with FIGS. 4A and 4B. FIG. 5A shows the magnetic field state and the magnetization boundary shift amount in a direction parallel to the substrate surface at a position apart by a predetermined distance from the conventional master medium. FIG. 5B shows the magnetic field state and the magnetization boundary shift amount in a direction parallel to the substrate surface at a position apart by a predetermined distance from the master medium of the present invention.

In the conventional master medium, as shown in FIG. 4A, a perpendicular ferromagnetic material 4 is formed in each concave portion 20 formed in the substrate 1. Recorded information on the master medium is transferred to a slave medium 5 by the action of the leakage magnetic flux of the perpendicular ferromagnetic material 4, i.e., magnetic lines of force 6 passing through the perpendicular ferromagnetic material 4, and an area 7 between the perpendicular ferromagnetic materials 4 where no magnetic lines of force are present. The magnetic field produced by the master medium at this time is shown in FIG. 5A. Due to variations in the external magnetic field, there is a difference $\Delta S1$ in the position of the slave medium inversion magnetic field Hi between the case where a strong external magnetic field Hs is applied and the case where a weak external magnetic field Hw is applied. FIG. 5A shows the fact that the magnetization boundary (i.e., the transfer pattern boundary) shifts due to the variations in the external magnetic field.

In the master medium of the present invention, recorded information on the master medium is transferred to the slave medium 5 by the action of the leakage magnetic flux of the first perpendicular ferromagnetic material 2, i.e., magnetic lines of force 8 passing through the first perpendicular ferromagnetic material 2, and magnetic lines of force 9 exerted in the opposite direction in the area between the first perpendicular magnetic materials 2. The magnetic field produced by the master medium at this time is shown in FIG. 5B. Due to variations in the external magnetic field, there is a difference $\Delta S2$ in the position of the slave medium inversion magnetic field Hi between the case where a strong external magnetic field Hs is applied and the case where a weak external magnetic field Hw is applied. FIG. 5B shows the fact that the magnetization boundary shifts due to the variations in the external magnetic field. In the master medium of the present invention, the magnetic field is about two times greater than that of the conventional master medium because of the presence of the magnetic lines of force 9 exerted in the opposite direction. As a result, the inclination of the magnetic field change becomes about two times steeper, and therefore the shift of the magnetization boundary becomes about a half ($\Delta S2 \cong \Delta S1/2$). Thus, this master medium enables more accurate transfer from the master medium to the slave medium 5.

The slave medium 5 and the master medium (the substrate 1, first perpendicular ferromagnetic material 2 and second perpendicular ferromagnetic material 3) are juxtaposed in performing transfer. "Being juxtaposed" means a state where they are positioned in close contact with each other or very close to each other.

In FIG. 4B, the slave medium 5 is a perpendicular ferromagnetic material, and the magnetization thereof has been initialized in one direction in advance. The present invention uses a magnetic transferring and recording method for transferring the recorded information on the master medium to the slave medium by applying an external magnetic field of a direction opposite to the initialized magnetization direction of the slave medium 5 in the state where the master medium and the slave medium 5 are mutually juxtaposed. Thus, it is possible to efficiently obtain the slave medium to which the recorded information on the master medium was accurately transferred by such a simple structure. Moreover, the slave medium to which the recorded information on the master medium was transferred by the magnetic transferring and recording method is inexpensive and has high accuracy because the recorded information is accurately transferred by a simple structure.

Figure 6A:
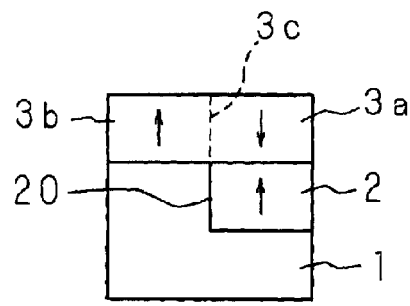
FIGS. 6A–6D are explanatory views of the magnetization direction according to an embodiment of the present invention.
Figure 6B:
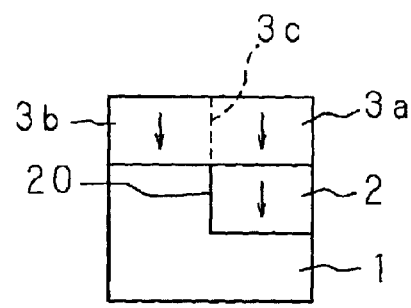

FIGS. 6A–6D are explanatory views of the magnetization direction according to an embodiment of the present invention. FIG. 6A shows the magnetization direction when a master medium is initialized. In the master medium shown in FIG. 6A, the first perpendicular ferromagnetic layer 2 and the second perpendicular ferromagnetic layer 3 are made of a TM (transition metal) rich-RE (rare-earth material) rich combination, that is, one of the first perpendicular ferromagnetic layer 2 and the second perpendicular ferromagnetic layer 3 is TM (transition metal) rich and the other is RE (rare-earth material) rich. Similarly, FIG. 6B shows the magnetization direction when a master medium is initialized. In the master medium shown in FIG. 6B, the first perpendicular ferromagnetic layer 2 and the second perpendicular ferromagnetic layer 3 are made of a TM rich-TM rich combination, or an RE rich-RE rich combination. The magnetization direction of the master medium in initialization is determined so that the magnetization direction of a second perpendicular ferromagnetic layer 3a in an area exchange-coupled to the first perpendicular ferromagnetic layer 2 is anti-parallel to the external magnetic field in transferring the recorded information to the slave medium. The magnetization direction during the exchange coupling differs depending on whether the first perpendicular ferromagnetic layer 2 and the second perpendicular ferromagnetic layer 3 are made of a TM rich-RE rich combination, or a TM rich-TM rich combination or an RE rich-RE rich combination. In either case, the initialization of the master medium is executed by applying a large external magnetic field in a direction to which the magnetization of the first perpendicular ferromagnetic layer 2 is desired to be directed and then making the external magnetic field zero.

In FIG. 6A, the first perpendicular ferromagnetic layer 2 and the second perpendicular ferromagnetic layer 3 are exchange-coupled when the magnetizations are anti-parallel. Thus, with respect to the magnetization direction of the first perpendicular ferromagnetic layer 2 (indicated by the upwards arrow in FIG. 6A), the magnetization direction of the exchange-coupled second perpendicular ferromagnetic layer 3a is the opposite direction (indicated by the downwards arrow in FIG. 6A). The magnetization direction of a second perpendicular ferromagnetic layer 3b in an area which is not exchange-coupled to the first perpendicular ferromagnetic layer 2 coincides with the direction of the external magnetic field in initialization, i.e., the magnetization direction of the first perpendicular ferromagnetic layer 2. In FIG. 6B, the first perpendicular ferromagnetic layer 2 and the second perpendicular ferromagnetic layer 3 are exchange-coupled when the magnetizations are parallel. Thus, with respect to the magnetization direction of the first perpendicular ferromagnetic layer 2 (indicated by the downwards arrow in FIG. 6B), the magnetization direction of the exchange-coupled second perpendicular ferromagnetic layer 3a becomes the same direction (indicated by the downwards arrow in FIG. 6B). The magnetization direction of the second perpendicular ferromagnetic layer 3b in an area which is not exchange-coupled to the first perpendicular ferromagnetic layer 2 coincides with the direction of the external magnetic field in initialization, i.e., the magnetization direction of the first perpendicular ferromagnetic layer 2. It should be noted that, when external magnetic field is applied, the magnetization direction of the second perpendicular ferromagnetic layer 3b changes into a magnetization direction shown in FIG. 6D. A boundary line (reference code 3c) between the second perpendicular ferromagnetic layer 3a and the second perpendicular ferromagnetic layer 3b is merely shown to indicate the magnetization directions of the second perpendicular ferromagnetic layer 3a and the second perpendicular ferromagnetic layer 3b, and corresponds to a pattern boundary in transferring the recorded information.

Figure 6C:
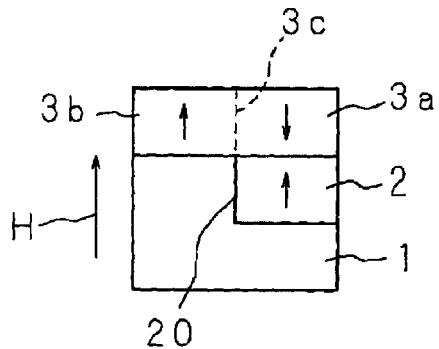
Figure 6D:
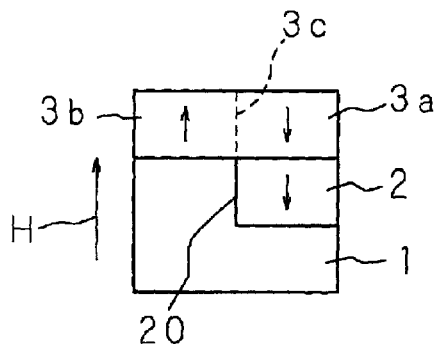

FIG. 6C shows the magnetization direction of the master medium during the application of the external magnetic field. The combination of the first perpendicular ferromagnetic layer 2 and the second perpendicular ferromagnetic layer 3 is the same as that of the master medium shown in FIG. 6A. Similarly, FIG. 6D shows the magnetization direction of the master medium during the application of the external magnetic field. The combination of the first perpendicular ferromagnetic layer 2 and the second perpendicular ferromagnetic layer 3 is the same as that of the master medium shown in FIG. 6B. In both cases shown in FIG. 6C and FIG. 6D, the first perpendicular ferromagnetic layer 2 and the second perpendicular ferromagnetic layer 3a have the same magnetization directions as those in initialization, while the second perpendicular ferromagnetic layer 3b has a magnetization direction which coincides with the direction of the external magnetic field. Consequently, in FIG. 6C, the magnetization direction of the first perpendicular ferromagnetic layer 2 and the magnetization direction of the second perpendicular ferromagnetic layer 3b are the same as that of an external magnetic field H (indicated by the upwards arrow in FIG. 6C). The magnetization direction of the second perpendicular ferromagnetic layer 3a is opposite to that of the external magnetic field H (indicated by the upwards arrow in FIG. 6C). In FIG. 6D, the magnetization direction of the first perpendicular ferromagnetic layer 2 and the magnetization direction of the second perpendicular ferromagnetic layer 3a are opposite to that of the external magnetic field H (indicated by the upwards arrow in FIG. 6D). The magnetization direction of the second perpendicular ferromagnetic layer 3b is the same as that of the external magnetic field H (indicated by the upwards arrow in FIG. 6D).

FIGS. 7A–7D and FIGS. 8A–8D are explanatory views of the magnetization state according to an embodiment of the present invention. In these figures, only the parts of the first perpendicular ferromagnetic layer 2 and second perpendicular ferromagnetic layer 3 are extracted and illustrated. The same parts as in FIGS. 6A–6D are designated with the same codes, and the explanation thereof is omitted. FIGS. 7A–7D illustrate a case where exchange coupling is made when the magnetizations are anti-parallel (a case where the first perpendicular ferromagnetic layer 2 is TM rich and the second perpendicular ferromagnetic layer 3 is RE rich, or a case where the first perpendicular ferromagnetic layer 2 is RE rich and the second perpendicular ferromagnetic layer 3 is TM rich). FIGS. 8A–8D illustrate a case where exchange coupling is made when the magnetizations are parallel (a case where the first perpendicular ferromagnetic layer 2 and the second perpendicular ferromagnetic layer 3 are TM rich, or a case where the first perpendicular ferromagnetic layer 2 and the second perpendicular ferromagnetic layer 3 are RE rich). FIGS. 7A–7D and FIGS. 8A–8D show possible four states of the combination of the magnetization directions (State 0 through State 3. State 0 is also an initial state).

"State 0" of FIG. 7A represents a case where the magnetization direction of the first perpendicular ferromagnetic layer 2 is the same as that of the external magnetic field H, and the magnetization direction of the second perpendicular ferromagnetic layer 3a is opposite to that of the external magnetic field H. "State 1" of FIG. 7B represents a case where the magnetization direction of the first perpendicular ferromagnetic layer 2 is the same as that of the external magnetic field H, and the magnetization direction of the second perpendicular ferromagnetic layer 3a is the same as that of the external magnetic field H. In this state, since exchange coupling is not made, a magnetic wall 10 exists. "State 2" of FIG. 7C represents a case where the magnetization direction of the first perpendicular ferromagnetic layer 2 is opposite to that of the external magnetic field H, and the magnetization direction of the second perpendicular ferromagnetic layer 3a is opposite to that of the external magnetic field H. In this sate, similarly to "State 1", the magnetic wall 10 exists. "State 3" of FIG. 7D represents a case where the magnetization direction of the first perpendicular ferromagnetic layer 2 is opposite to that of the external magnetic field H, and the magnetization direction of the second perpendicular ferromagnetic layer 3a is the same as that of the external magnetic field H.

Figure 8A:
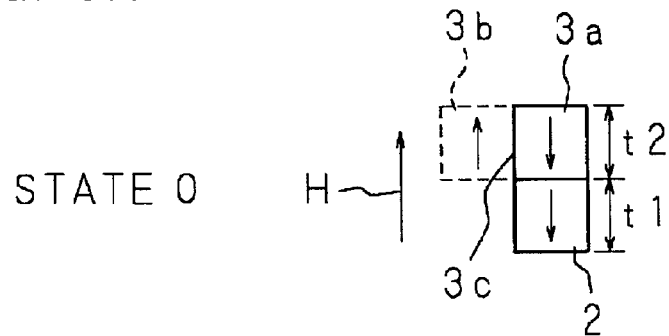
FIGS. 8A–8D are explanatory views of the magnetization state according to an embodiment of the present invention.
Figure 8B:
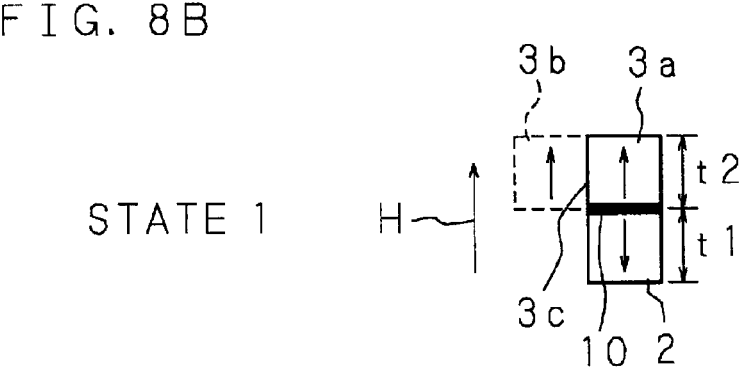
Figure 8C:
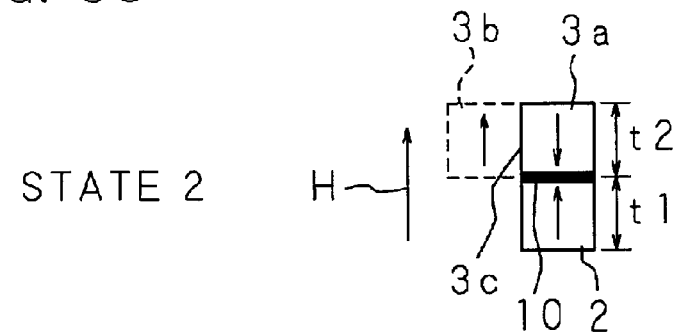
Figure 8D:
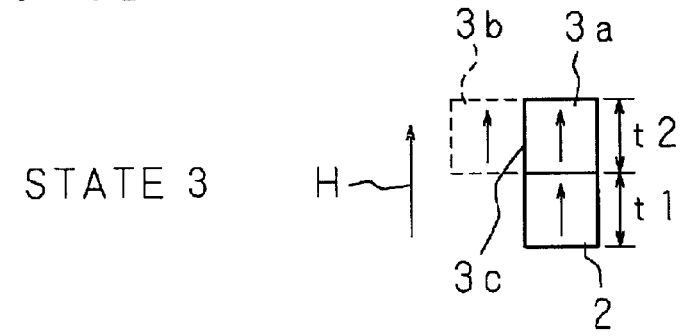

"State 0" of FIG. 8A represents a case where the magnetization direction of the first perpendicular ferromagnetic layer 2 is opposite to that of the external magnetic field H, and the magnetization direction of the second perpendicular ferromagnetic layer 3a is opposite to that of the external magnetic field H. "State 1" of FIG. 8B represents a case where the magnetization direction of the first perpendicular ferromagnetic layer 2 is opposite to that of the external magnetic field H, and the magnetization direction of the second perpendicular ferromagnetic layer 3a is the same as that of the external magnetic field H. In this state, since exchange coupling is not made, the magnetic wall 10 exists. "State 2" of FIG. 8C represents a case where the magnetization direction of the first perpendicular ferromagnetic layer 2 is the same as that of the external magnetic field H, and the magnetization direction of the second perpendicular ferromagnetic layer 3a is opposite to that of the external magnetic field H. In this sate, similarly to "State 1", the magnetic wall 10 exists. "State 3" of FIG. 8D represents a case where the magnetization direction of the first perpendicular ferromagnetic layer 2 is the same as that of the external magnetic field H, and the magnetization direction of the second perpendicular ferromagnetic layer 3a is the same as that of the external magnetic field H.

The saturation magnetization (magnetic moment per unit volume), coercive force and layer thickness of the first perpendicular ferromagnetic layer 2 are denoted as Ms1, Hc1 and t1, respectively. Besides, the saturation magnetization, coercive force and layer thickness of the second perpendicular ferromagnetic layer 3 are denoted as Ms2, Hc2 and t2, respectively. The magnetic wall energy produced when a magnetic wall exists at the interface between the first perpendicular ferromagnetic layer 2 and the second perpendicular ferromagnetic layer 3 is denoted as σw. An external magnetic field applied in transferring the recorded information from the master medium to the slave medium is denoted as H. For simplification, suppose that an area of the second perpendicular ferromagnetic layer 3b, which is not in contact with the first perpendicular ferromagnetic layer 2, has already followed the direction of the external magnetic field H.

In FIGS. 7A–7D, for the area of a pair of the first perpendicular ferromagnetic layer 2 and second perpendicular ferromagnetic layer 3a, energy E0 in State 0, energy E1 in State 1, energy E2 in State 2, and energy E3 in State 3 are expressed by equations (1), (2), (3) and (4), respectively. The area of the second perpendicular ferromagnetic layer 3b, which is not in contact with the first perpendicular ferromagnetic layer 2, is common to all the states and is omitted in calculation.

$$E0 = (Ms1 \cdot t1 - Ms2 \cdot t2)H \tag{1}$$

$$E1 = (-Ms1 \cdot t1 - Ms2 \cdot t2)H + \sigma w \tag{2}$$

$$E2 = (Ms1 \cdot t1 + Ms2 \cdot t2)H + \sigma w \tag{3}$$

$$E3 = (-Ms1 \cdot t1 + Ms2 \cdot t2)H \tag{4}$$

Considering the coercive forces Hc1 and Hc2, external magnetic fields H01, H02 and H03 necessary for transition from State 0 to State 1, State 2 and State 3 are shown by equations (5), (6) and (7), respectively.

$$H01 = (\sigma w + 2Ms2 \cdot Hc2 \cdot t2)/(2Ms1 \cdot t1) \tag{5}$$

$$H02 = (\sigma w + 2Ms1 \cdot Hc1 \cdot t1)/(-2Ms2 \cdot t2) \tag{6}$$

$$H03 = \{\sigma w + 2(Ms1 \cdot Hc1 - t1 + Ms2 \cdot Hc2 \cdot t2)\}/2(Ms1 \cdot t1 - Ms2 \cdot t2) \tag{7}$$

In the case where the external magnetic field H is applied in transferring the recorded information to the slave medium, in order to maintain "State 0" or "State 2" that permits the transfer to the slave medium, it is necessary to satisfy the condition "H<H01, H03". If "H01, H03<H", then patterns of magnetization are not formed in the master medium (State 1 and State 3 where the pattern boundary 3c is not produced), and consequently transfer is not performed at all. Therefore, in order to more certainly realize the transfer, H01 and H03 are desired to be extremely large relative to H.

In order to increase H01, it is considered to "increase σw, increase Ms2, increase Hc2, and decrease Ms1·t1", based on the equation (5). In order to increase H03, it is considered to "increase σw, increase Ms1 and Ms2, increase Hc1 and Hc2, and decrease Ms1·t1−Ms2·t2 within the positive range", based on the equation (7). Moreover, in order to certainly direct the magnetization of a non-exchange-coupled portion of the second perpendicular ferromagnetic layer 3b to the direction of the external magnetic field, it is necessary to satisfy Hc2<H. Accordingly, Hc2 is desired to be decreased. Furthermore, Ms2·t2 which relates to the magnitude of the magnetic field produced by the master medium is desired to be increased. Considering the above requirements as a whole, it is effective to "increase σw, increase Hc1, and certainly maintain the relation Ms1·t1>Ms2·t2". In particular, the relation Ms1·t1>Ms2·t2 is an essential condition because the relation relates to the change of the direction of the external magnetic field H03.

In FIGS. 8A–8D, for the area of a pair of the first perpendicular ferromagnetic layer 2 and second perpendicular ferromagnetic layer 3a, energy E0 in State 0, energy E1 in State 1, energy E2 in State 2, and energy E3 in State 3 are expressed by equations (8),(9), (10) and (11), respectively. The area of the second perpendicular ferromagnetic layer 3b, which is not in contact with the first perpendicular ferromagnetic layer 2, is common to all the states and is omitted in calculation.

$$E0 = (Ms1 \cdot t1 + Ms2 \cdot t2)H \tag{8}$$

$$E1 = (-Ms1 \cdot t1 + Ms2 \cdot t2)H + \sigma w \tag{9}$$

$$E2 = (Ms1 \cdot t1 - Ms2 \cdot t2)H + \sigma w \tag{10}$$

$$E3 = (-Ms1 \cdot t1 - Ms2 \cdot t2)H \tag{11}$$

Considering the coercive forces Hc1 and Hc2, the external magnetic fields H01, H02 and H03 necessary for transition from State 0 to State 1, State 2 and State 3 are shown by equations (12), (13) and (14), respectively.

$$H01 = (\sigma w + 2Ms2 \cdot Hc2 \cdot t2)/(2Ms1 \cdot t1) \quad (12)$$

$$H02 = (\sigma w + 2Ms1 \cdot Hc1 \cdot t1)/(2Ms2 \cdot t2) \quad (13)$$

$$H03 = \{\sigma w + 2(Ms1 \cdot Hc1 \cdot t1 + Ms2 \cdot Hc2 \cdot t2)\} 2(Ms1 \cdot t1 + Ms2 \cdot t2) \quad (14)$$

In the case where the external magnetic field H is applied in transferring the recorded information to the slave medium, in order to maintain "State 0" or "State 2" that permits the transfer to the slave medium, it is necessary to satisfy the condition "H<H01, H03,". If "H01, H03<H", then patterns of magnetization are not formed in the master medium (State 1 and State 3 where the pattern boundary 3c is not produced), and consequently transfer is not performed at all. Therefore, in order to more certainly realize the transfer, H01 and H03 are desired to be extremely large relative to H.

In order to increase H01, it is considered to "increase $\sigma w$, increase Ms2, increase Hc2, and decrease Ms1·t1" based on the equation (12). In order to increase H03, it is considered to "increase $\sigma w$, increase Ms1 and Ms2, increase Hc1 and Hc2, and decrease Ms1-t1+Ms2·t2", based on the equation (14). Moreover, in order to certainly direct the magnetization of a non-exchange-coupled portion of the second perpendicular ferromagnetic layer 3b to the direction of the external magnetic field, it is necessary to satisfy Hc2<H. Accordingly, Hc2 is desired to be decreased. Furthermore, Ms2·t2 which relates to the magnitude of the magnetic field produced by the master medium is desired to be increased. Considering the above requirements as a whole, it is effective to "increase $\sigma w$, increase Hc1, increase Ms2 and decrease Ms1·t1".

Figure 9A:
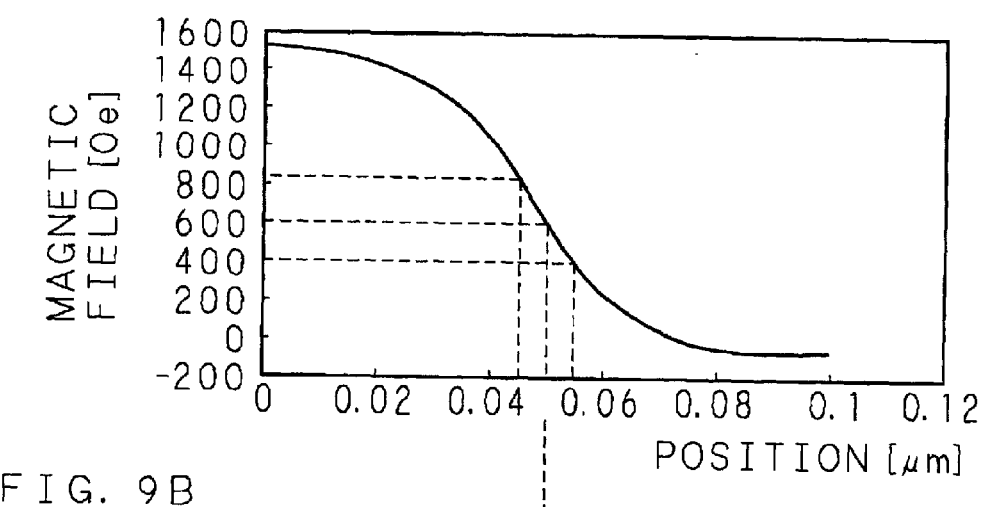
FIGS. 9A and 9B are explanatory views of the magnetic field state and magnetization boundary shift amount according to an example of the present invention.
Figure 9B:
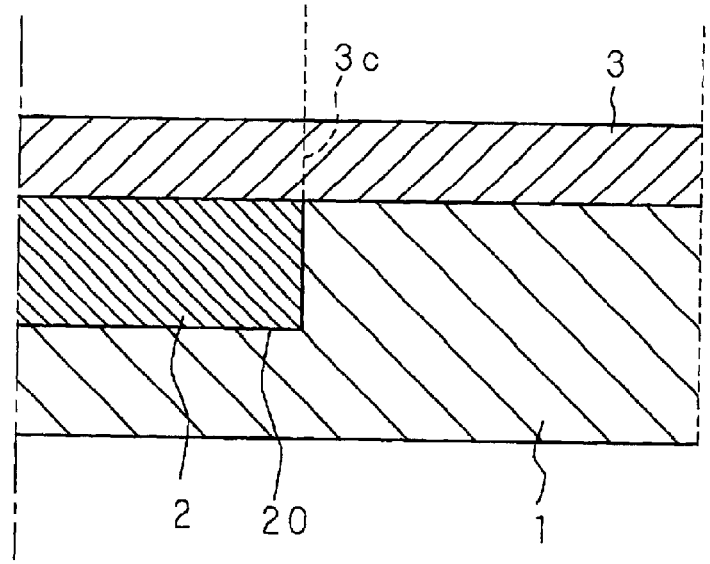

FIGS. 9A and 9B are explanatory views of the magnetic field state and the magnetization boundary shift amount according to an example of the present invention. Regarding the master medium, the magnetic material used for the first perpendicular ferromagnetic layer 2 is $Tb_{26}Fe_{56}CO_{18}$ (Ms1=40 emu/cc, Hc1>15 kOe, t1=40 nm, RE rich). The magnetic material used for the second perpendicular ferromagnetic layer 3 is $Tb_{32}Fe_{68}$ (Ms2=300 emu/cc, Hc2=800 Oe, t2=40 nm, RE rich). $\sigma w/(Ms1 \cdot t1)$=8 kOe. For reference, 1(emu/cc)=$4\pi/10000$(Wb/m$^2$)=1.257(mT), and 1(Oe)=$1000/4\pi$(A/m)=79.58(A/m). FIG. 9A shows a change of the magnetic field produced by the master medium at a position 20 nm apart from the surface of the master medium where the concave portion 20 with a diameter of 0.1 $\mu$m is formed. FIG. 9B shows the cross section of the master medium in association with FIG. 9A.

As shown in FIG. 9A, the magnetic field produced by the master medium at the pattern boundary 3c is 600 Oe. Accordingly, if 2.4 kOe is applied as an external magnetic field, it is possible to transfer the recorded information to a slave medium having a coercive force of 3 kOe. Regarding the magnetic field produced by the master medium at ±10% position with respect to the pattern boundary 3c (positioned 0.5 $\mu$m apart from the center), as shown in FIG. 9A, the magnetic field at the +10% position is 400 Oe, while the magnetic field at the −10% position is 815 Oe. Thus, if the external magnetic field is within a range of 2.185 to 2.60 kOe, it is possible to achieve the transfer with pattern accuracy (positional accuracy) of ±10%. In this case, the margin of the external magnetic field is (2.185−2.4)/2.4=−0.09 to (2.60−2.4)/2.4=+0.08, and thus −9 to +8(%). According to equations (12) to (14), the external magnetic fields H01, H02 and H03 in State 1, State 2 and State 3 (see FIGS. 8B–8D) are 7.75 kOe, 2.53 kOe and 2.68 kOe, respectively. Accordingly, if the external magnetic field is within the range of 2.185 to 2.60 kOe, then the state is State 0 or State 2. In either state, the area of the second perpendicular ferromagnetic layer 3 (3a) that makes a pair with the first perpendicular ferromagnetic layer 2 can maintain the initial state.

Figure 1A:
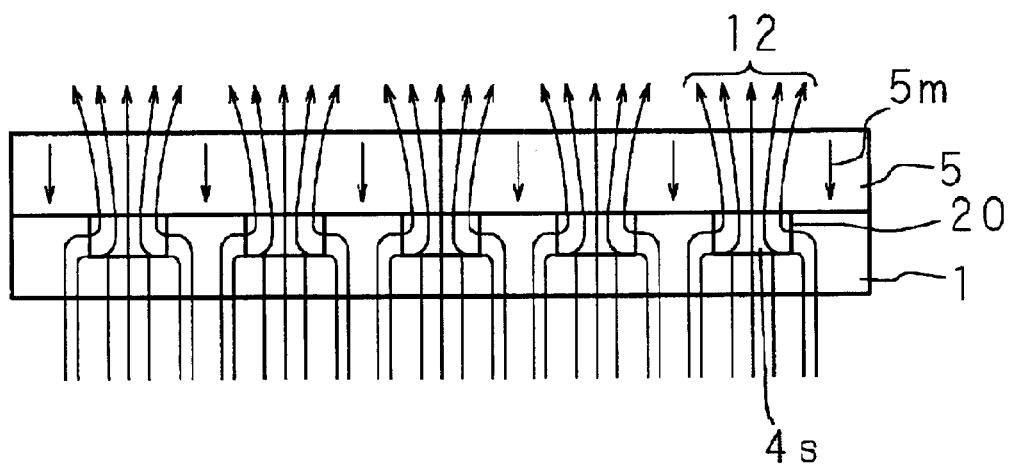
FIGS. 1A and 1B are explanatory views of a conventional master medium for magnetic transfer.
Figure 1B:
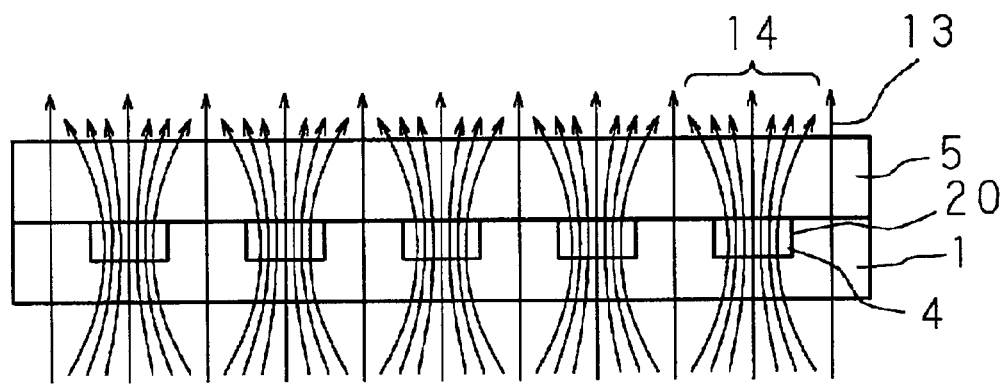
Figure 2A:
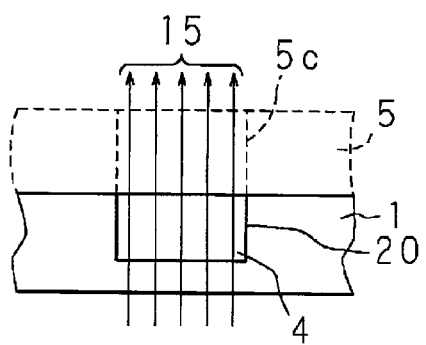
FIGS. 2A–2D are explanatory views of the magnetic field state and magnetization boundary shift amount of the conventional master medium for magnetic transfer.
Figure 2B:
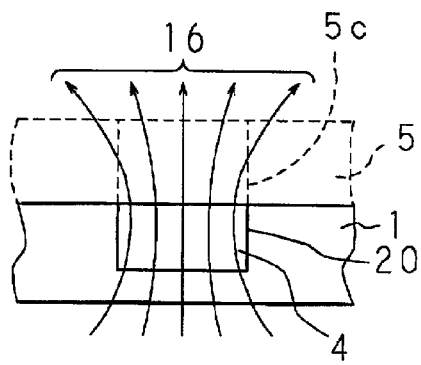
Figure 2C:
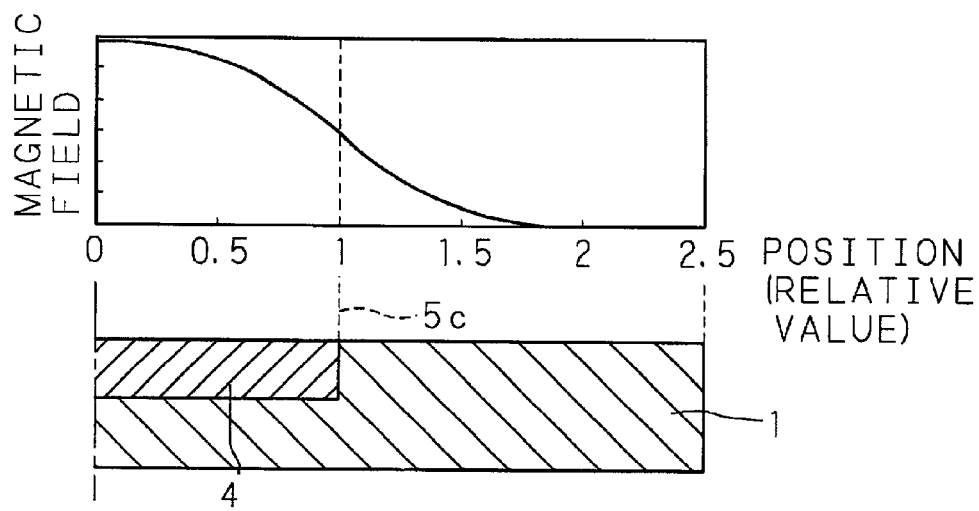
Figure 2D:
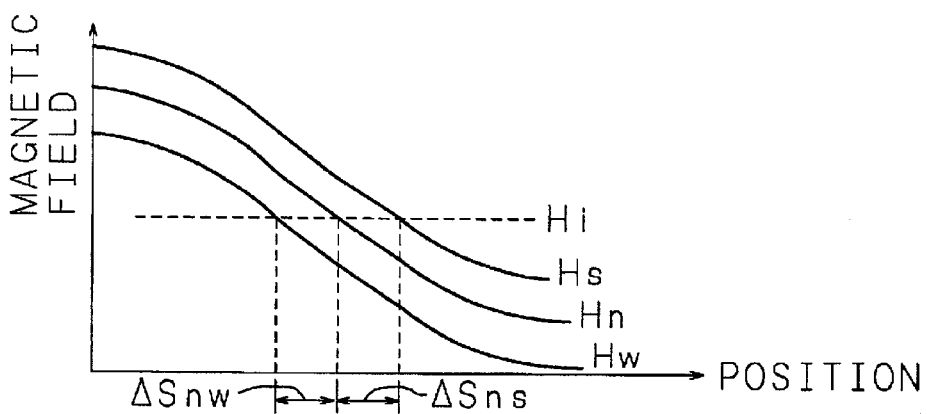

In the conventional master medium shown in FIG. 1B, the magnetic field produced by the master medium is a half of that of the master medium according to the present invention. Regarding the magnetic field produced by the master medium at ±10% position with respect to the pattern boundary (3c), the magnetic field at the +10% position is 200 Oe and the magnetic field at the −10% position is 407 Oe. Accordingly, if the external magnetic field is within a range of 2.593 to 2.80 kOe, then it is possible to perform transfer with pattern accuracy (positional accuracy) of ±10%. In this case, the margin of the external magnetic field is (2.593−2.7)/2.7=−0.04 to (2.80−2.7)/2.7=+0.03, and thus −4 to +3(%). In other words, according to the master medium of the present invention, the margin of the external magnetic field to be applied is about two or more times greater than that of the conventional master medium.

Figure 10A:
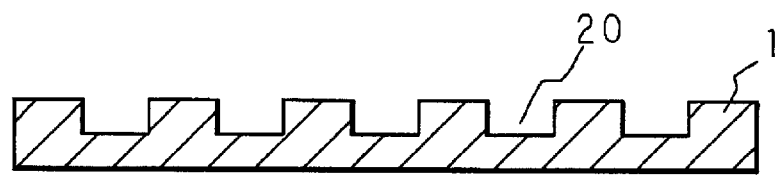
FIGS. 10A–10D are views showing the steps of producing a master medium for magnetic transfer according to the present invention.
Figure 10B:
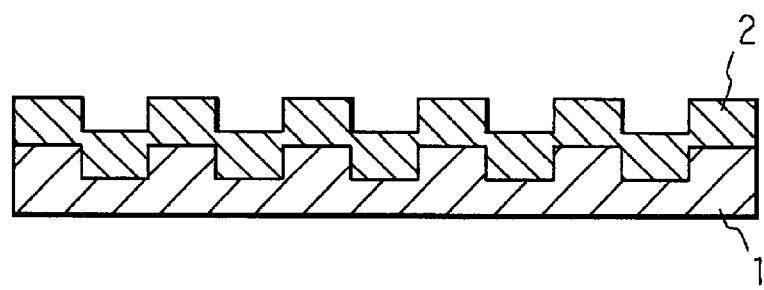
Figure 10C:
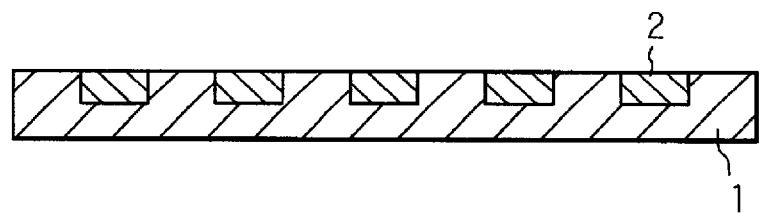
Figure 10D:
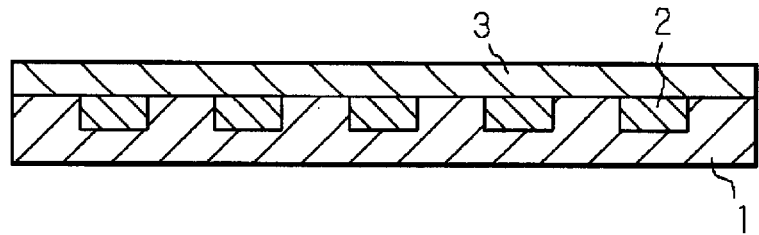

FIGS. 10A–10D are views showing the steps of producing the master medium of the present invention. In these figures, the substrate 1 is a non-magnetic material having a flat surface, and the material is one described above (see FIG. 3). The substrate 1 is provided with concave portions 20 on the surface thereof, which are formed corresponding to a pattern of recorded information to be transferred (FIG. 10A). The concave portions 20 are formed by a normally used photolithography technique. As an etching technique, it is possible to use a reactive etching technique or the like. The shape of the concave portion 20 has a diameter of 0.1 $\mu$m and a depth of 40 nm as described in the above example. On the surface of the substrate 1 provided with the concave portions 20, the first perpendicular ferromagnetic layer 2 is deposed to fill the concave portions 20 by using a film deposition technique such as sputtering (FIG. 10B). The substrate 1 having the first perpendicular ferromagnetic layer 2 deposited/formed thereon is flattened by physical etching using argon plasma, for example, so that the surface of the substrate 1 and the surface of the first perpendicular ferromagnetic layer 2 formed in the concave portions 20 form a single flat surface (FIG. 10C). The aim of flattening the surface is to increase the magnetic wall energy $\sigma w$. In order to remove oxide and nitride which were produced and remain on the surface of the substrate 1 having the flattened surface, etching, for example, chemical etching is further performed. With the etching, the surface of the substrate 1 and the surface of the first perpendicular ferromagnetic layer 2 are cleaned (FIG. 10C). The aim of etching for cleaning is to ensure large $\sigma w$. The oxide and nitride remaining on the surface are substances having different characteristics from the characteristic of the magnetic material. Therefore, if they are kept, then exchange coupling between the second perpendicular ferromagnetic layer 3 to be formed thereafter and the previously formed first perpendicular ferromagnetic layer 2 becomes weaker and $\sigma w$ can not be increased. The second perpendicular ferromagnetic layer 3 is formed on the surface of the substrate 1 and the surface of the first perpendicular ferromagnetic layer 2 which were cleaned (FIG. 10D). The method for depositing the second perpendicular ferromagnetic layer 3 may be a process of the same kind as that for the first perpendicular ferromagnetic layer 2, or a different method may be suitably used. As this invention may be implemented in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A master medium for magnetic transfer comprising:
   a non-magnetic substrate;
   a first perpendicular ferromagnetic layer deposited in a concave portion formed in a surface of the substrate; and
   a second perpendicular ferromagnetic layer layered on the surface of the substrate and a surface of the first perpendicular ferromagnetic layer.

2. The master medium for magnetic transfer according to claim 1,
   wherein the surface of the substrate and the surface of the first perpendicular ferromagnetic layer are flattened to form a single flat surface.

3. The master medium for magnetic transfer according to claim 2,
   wherein exchange coupling is performed so that a magnetization direction of the first perpendicular ferromagnetic layer and a magnetization direction of the second perpendicular ferromagnetic layer are parallel to each other.

4. The master medium for magnetic transfer according to claim 2,
   wherein exchange coupling is performed so that a magnetization direction of the first perpendicular ferromagnetic layer and a magnetization direction of the second perpendicular ferromagnetic layer are anti-parallel to each other, and
   saturation magnetization $Ms1$ and layer thickness $t1$ of the first perpendicular ferromagnetic layer and saturation magnetization $Ms2$ and layer thickness $t2$ of the second perpendicular ferromagnetic layer satisfy a relation $Ms1 \cdot t1 > Ms2 \cdot t2$.

5. The master medium for magnetic transfer according to claim 1,
   wherein exchange coupling is performed so that a magnetization direction of the first perpendicular ferromagnetic layer and a magnetization direction of the second perpendicular ferromagnetic layer are parallel to each other.

6. The master medium for magnetic transfer according to claim 1,
   wherein exchange coupling is performed so that a magnetization direction of the first perpendicular ferromagnetic layer and a magnetization direction of the second perpendicular ferromagnetic layer are anti-parallel to each other, and
   saturation magnetization $Ms1$ and layer thickness $t1$ of the first perpendicular ferromagnetic layer and saturation magnetization $Ms2$ and layer thickness $t2$ of the second perpendicular ferromagnetic layer satisfy a relation $Ms1 \cdot t1 > Ms2 \cdot t2$.

7. A magnetic transferring and recording method for transferring recorded information on a master medium for magnetic transfer to a slave medium for magnetic recording, comprising the steps of:
   preparing the master medium for magnetic transfer which comprises a non-magnetic substrate, a first perpendicular ferromagnetic layer deposited in a concave portion formed in a surface of the substrate, and a second perpendicular ferromagnetic layer layered on the surface of the substrate and a surface of the first perpendicular ferromagnetic layer;
   juxtaposing the master medium for magnetic transfer and the slave medium for magnetic recording having a perpendicular anisotropy whose magnetization has been initialized in one direction in advance; and
   applying an external magnetic field of a direction opposite to the initialized magnetization direction of the slave medium for magnetic recording.

8. The magnetic transferring and recording method according to claim 7,
   wherein the surface of the substrate and the surface of the first perpendicular ferromagnetic layer are flattened to form a single flat surface.

9. The magnetic transferring and recording method according to claim 8,
   wherein exchange coupling is performed so that a magnetization direction of the first perpendicular ferromagnetic layer and a magnetization direction of the second perpendicular ferromagnetic layer are parallel to each other.

10. The magnetic transferring and recording method according to claim 8,
    wherein exchange coupling is performed so that a magnetization direction of the first perpendicular ferromagnetic layer and a magnetization direction of the second perpendicular ferromagnetic layer are anti-parallel to each other, and
    saturation magnetization $Ms1$ and layer thickness $t1$ of the first perpendicular ferromagnetic layer and saturation magnetization $Ms2$ and layer thickness $t2$ of the second perpendicular ferromagnetic layer satisfy a relation $Ms1 \cdot t1 > Ms2 \cdot t2$.

11. The magnetic transferring and recording method according to claim 7,
    wherein exchange coupling is performed so that a magnetization direction of the first perpendicular ferromagnetic layer and a magnetization direction of the second perpendicular ferromagnetic layer are parallel to each other.

12. The magnetic transferring and recording method according to claim 7,
    wherein exchange coupling is performed so that a magnetization direction of the first perpendicular ferromagnetic layer and a magnetization direction of the second perpendicular ferromagnetic layer are anti-parallel to each other, and
    saturation magnetization $Ms1$ and layer thickness $t1$ of the first perpendicular ferromagnetic layer and saturation magnetization $Ms2$ and layer thickness $t2$ of the second perpendicular ferromagnetic layer satisfy a relation $Ms1 \cdot t1 > Ms2 \cdot t2$.

13. A method for producing a master medium for magnetic transfer having a first perpendicular ferromagnetic layer and a second perpendicular ferromagnetic layer on a substrate surface, comprising:

the step of forming a concave portion in the substrate surface;

the step of forming the first perpendicular ferromagnetic layer in the concave portion by depositing the first perpendicular ferromagnetic layer on the substrate surface;

a flattening step of flattening the substrate surface and a surface of the first perpendicular ferromagnetic layer to form a single flat surface; and a depositing step of depositing the second perpendicular ferromagnetic layer on the flattened substrate surface and first perpendicular ferromagnetic layer surface.

14. The method for producing a master medium for magnetic transfer according to claim 13, further comprising the step of etching the flattened substrate surface and first perpendicular ferromagnetic layer surface, between the flattening step and depositing step.

* * * * *